L. POCCIA.
AUTOMOBILE AIR COMPRESSOR.
APPLICATION FILED MAR. 6, 1917.
1,255,632.
Patented Feb. 5, 1918.
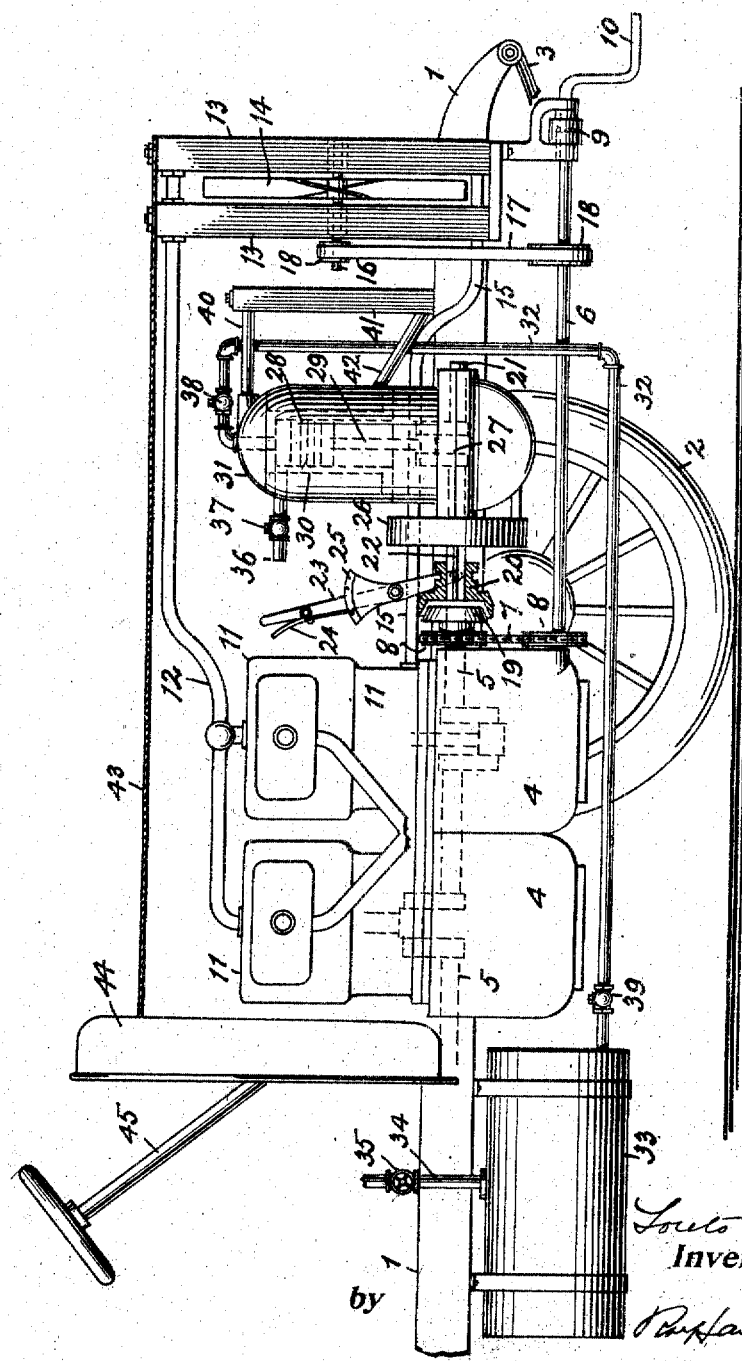
Loreto Poccia
Inventor:
by
Atty

UNITED STATES PATENT OFFICE.

LORETO POCCIA, OF MAMARONECK, NEW YORK.

AUTOMOBILE AIR-COMPRESSOR.

1,255,632.  Specification of Letters Patent.  Patented Feb. 5, 1918.

Application filed March 6, 1917. Serial No. 152,664.

*To all whom it may concern:*

Be it known that I, LORETO POCCIA, of the town of Mamaroneck, in the county of Westchester and State of New York, have invented a new and useful Automobile Air-Compressor, of which the following is a specification.

This invention relates to an automobile air compressor particularly adapted for use in drilling holes in rocks for blasting operations, operating vacuum cleaners, pumping purposes, and various other purposes in which compressed air, or suction may be employed as the motive power.

The invention further aims to provide a device or apparatus for the purpose specified, that shall be simple in construction, strong, durable, efficient in use, readily operated, and conveniently moved to the place where the work is to be done.

With the foregoing and other objects in view, hereinafter more particularly specified, the invention consists of the novel construction, combination and arrangements hereinafter described, and illustrated in the accompanying drawings, wherein is shown the preferred embodiment of the invention; but it is understood that changes, variations and modifications can be resorted to which come within the scope of the claims hereunto appended.

In describing the invention in detail, reference is had to the accompanying drawings which form a part of this specification, wherein like reference characters denote corresponding parts, and wherein is shown in side elevation and partly in section, a device embodying my invention.

As illustrated in the drawings, 1 represents a side bar of a main frame, mounted upon wheels 2, one of which is shown in the drawings. The frame may be of any suitable construction adapted to support the several elements comprising the invention, and is preferably carried on four wheels to form a truck which may be provided with a spring 3. The motive power for propelling the truck is furnished by an internal combustion engine 4 of the kind now in use having a driving shaft 5, indicated by dotted lines, suitably journaled and connected with a cranking shaft 6, that is offset from the main driving shaft 5, and connected with the said driving shaft by means of an endless chain 7 that engages sprocket wheels 8 mounted on the driving shaft and crank shaft respectively. The crank shaft may be provided with the usual ratchet 9, and handle 10. The engine 4 is provided with a water jacket 11 having a supply or flow pipe 12 that communicates with a radiator comprising two sections 13 spaced apart, and having a fan 14 interposed between said sections. A return pipe 15 leads from the radiator sections back to the water jacket 11 of the engine; by means of which circulation is maintained between the water jacket of the engine and the radiator sections 13. The fan 14 between the radiator sections 13 is mounted upon a shaft 16 suitably journaled, and the shaft is operated by a belt 17 that engages pulleys 18 mounted upon the shaft 16 and the cranking shaft 6 respectively, by means whereof the fan 14 is operated by the cranking shaft 6 which is driven by the main shaft 5. One end of the shaft 5 is provided with a clutch member 19 that is adapted to engage another member 20 of the clutch so as to operate a shaft 21 on which the last named clutch member is mounted. The shaft 21 is provided with a spline 22 that engages the clutch member 20 and permits said clutch member to be moved bodily longitudinally of the shaft 21 to a limited extent by means of a pivoted lever 23 or otherwise, and when moved into the desired position the clutch member 20 is maintained in that position by means of a latch 24 mounted on said lever and adapted to engage a notched sector 25. By moving the clutch member backward with the aid of the lever 23, the clutch member 20 is brought into frictional contact with the clutch member 19 and the shaft 21 is rotated by the driving shaft 5 and by moving said clutch member forward the clutch member is removed from engagement with the clutch member 19 and the shaft 21 remains idle while the driving shaft 5 and the cranking shaft 6 are in operation.

The shaft 21 is provided with a fly wheel 26, and a crank 27 that is connected with a piston or plunger 28 by means of a rod 29 within a cylinder 30 of an air compressor, the crank, connecting rod, piston, and cylinder of the compressor, being indicated by dotted lines. The several parts constituting the compressor which is of ordinary construction, are inclosed within a water jacket 31.

A pipe connection 32 is provided between the cylinder of the compressor and a receiving tank 33 to permit the passage of the air compressed from the cylinder of the compressor to said tank from which it may be delivered from the outlet 34. The outlet pipe 34 is provided with a valve 35.

When the clutch members 19 and 20 are brought in frictional contact and the shaft 21 is rotated by the shaft 5, the piston of the compressor is placed in operation taking air in through an intake 36, and after being compressed by the piston of the compressor is delivered to the receiving tank 33 by means of the pipe connection 32. The intake may be provided with a check valve 37, and the discharge pipe 32 leading from the compressor to the receiving tank 33 may be provided with a check valve 38 to hold a pump if one is used, and another check valve 39 near the receiving tank to hold the receiving tank.

A pipe 40 is provided in connection with the water jacket of the compressor to permit the flow of water from the water jacket of the compressor to an auxiliary radiator 41 and a return pipe 42, to permit the return of water from the radiator to the water jacket of the compressor, so as to cool the compressor when in operation.

The radiator 41 is cooled by the action of the fan 14 which sucks air through the front section of the main radiator and forces that air through the rear section of said radiator and against the auxiliary radiator 41 that cools the water circulating through the water jacket of the compressor.

The main and auxiliary radiators as well as the operating engine and condenser are inclosed within a hood that may have a door or other means, not shown, for providing access to the parts inclosed thereby. The rear end of said hood may be connected to a dash board 44. When desired, the air compressor may be used as a section pump to produce a partial vacuum for cleaning, or other purposes.

I claim

1. The combination of an internal combustion engine mounted upon a wheeled frame and provided with a water jacket, a radiator in two sections connected with said jacket, a fan between said sections, means for operating said fan, a compressor having a water jacket and an auxiliary radiator connected with the water jacket of said compressor.

2. The combination of an internal combustion engine mounted upon a wheeled frame and provided with a water jacket, a radiator connected with said water jacket, a compressor provided with a water jacket, a radiator connected with the water jacket of the compressor, a fan adapted to aid in cooling the radiator of said compressor and means for operating said fan.

3. In a device of the character described, the combination of an internal combustion engine having a water jacket, a radiator connected with said water jacket, a fan in close proximity to said radiator, a compressor having a water jacket, and a radiator connected with the jacket of said compressor in close proximity to said fan.

4. In a device of the character described, an internal combustion engine having a crank shaft and a water jacket, a radiator connected with said water jacket, a clutch member on said crank shaft, a compressor having a water jacket and a crank shaft provided with a clutch member adapted to engage the clutch member of the engine, means for operating the clutch member of the compressor shaft, an auxiliary shaft offset from the crank shaft of said engine and rotatably connected therewith, a radiator connected with the water jacket of said compressor, a fan arranged in close proximity to the compressor radiator and means for operating said fan.

LORETO POCCIA.

Witnesses:
ROBERT W. HARDIE,
ORESTE POCCIA.